May 12, 1970  L. O. WATTS  3,511,126
CYLINDRICAL RETAINING PIN OF SUBSTANTIALLY
RIGID CONSTRUCTION
Original Filed Dec. 6, 1967  2 Sheets-Sheet 2
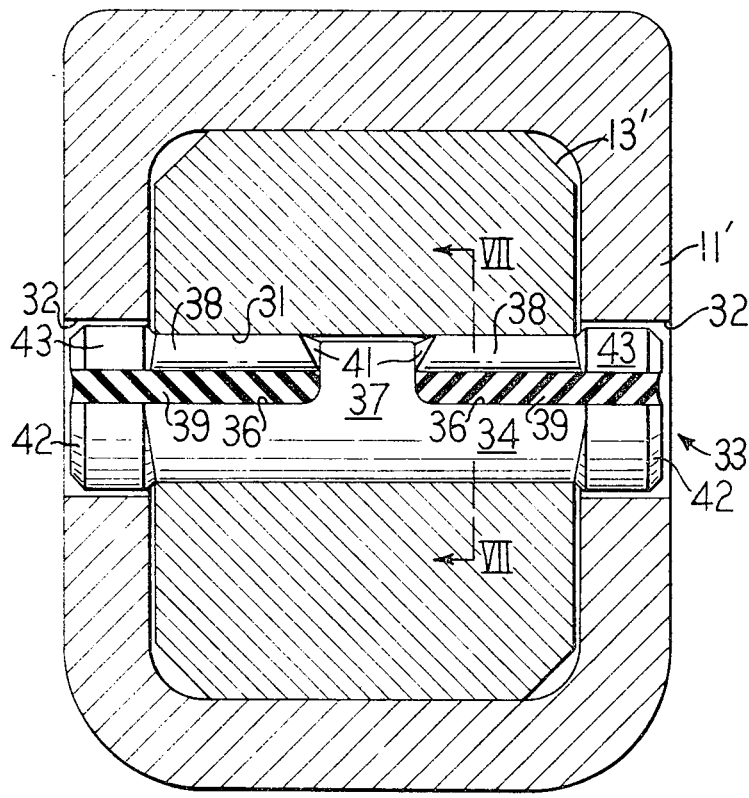
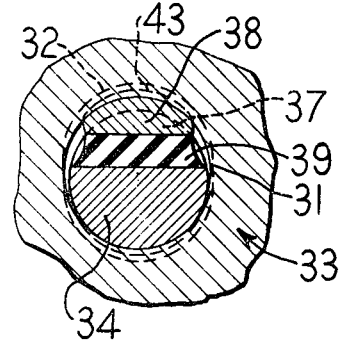
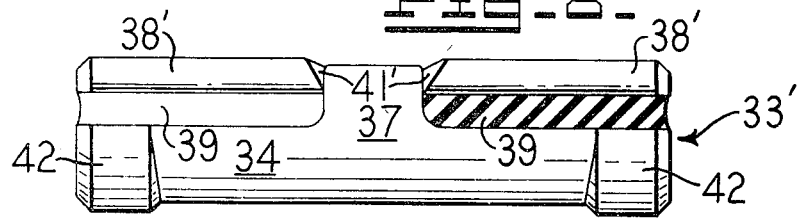
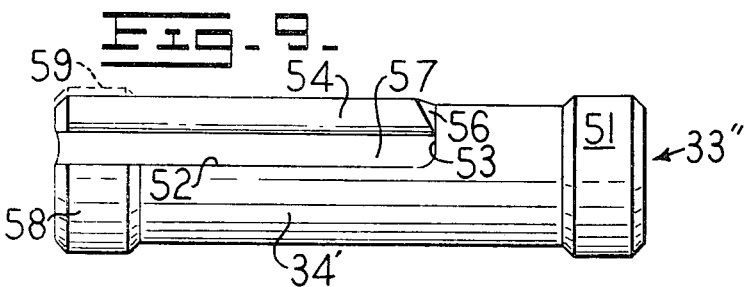
INVENTOR.
LOYAL O. WATTS
BY
ATTORNEYS United States Patent Office 3,511,126
Patented May 12, 1970

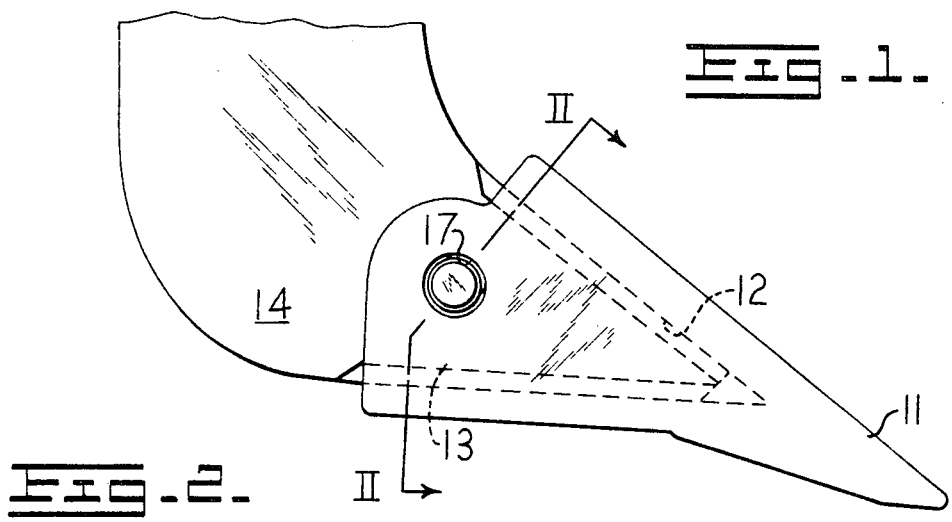
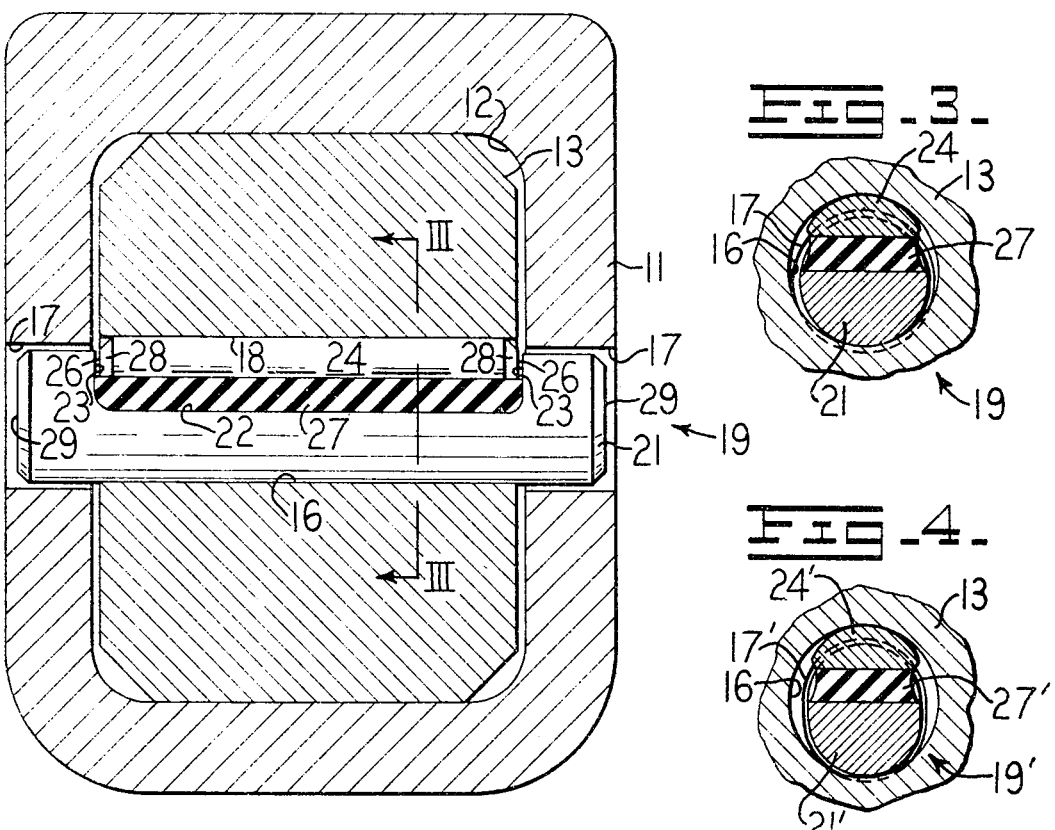
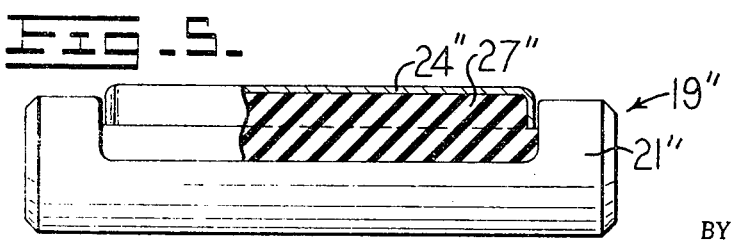
INVENTOR.
LOYAL O. WATTS

3,511,126
CYLINDRICAL RETAINING PIN OF SUBSTANTIALLY RIGID CONSTRUCTION
Loyal O. Watts, Peoria, Ill., assignor to Caterpillar Tractor Co., Peoria, Ill., a corporation of California
Original application Dec. 6, 1967, Ser. No. 688,474. Divided and this application Oct. 18, 1968, Ser. No. 794,441
Int. Cl. F16b 19/02, 21/14
U.S. Cl. 85—8.3                    3 Claims

ABSTRACT OF THE DISCLOSURE

A cylindrical retaining pin of the type having two elongated pin segments with resilient spreader means interposed therebetween. One pin segment forms substantially more than one half of the rigid cross-section of the pin assembly along its length for greater pin strength. The other pin segment may be formed from sheet metal. The two pin segments have generally normal surfaces which are in positively opposing relation in the pin assembly.

---

This application is a division of my co-pending application Ser. No. 688,474 filed Dec. 6, 1967, now Pat. No. 3,468,210.

The present invention relates to a retaining pin assembly for joining two parts which define generally coaxial bores. More particularly, the retaining pin is preferably employable for suitably securing a ripper tip on a shank where the ripper tip defines a generally coaxial bore at each end of a central bore in the shank. Ripper tips and similar members such as replaceable teeth on other earthmoving machinery experience substantial wear from contact with rocks and the like. It is desirable that these members be rapidly and economically replaceable. In addition, since they are commonly employed to process material which subsequently passes to a rock crusher, the ripper tips must be firmly secured upon the shanks to prevent loss of the tip. Loss of a ripper tip, which is necessarily hardened to resist wear, may result in its passing through the rock crusher and causing considerable expenditure of time and money for repairs.

The present invention provides a cylindrical retaining pin which is of economically simple construction and has greater shear strength to secure such members together with greater reliability. The cylindrical retaining pin is of a type having at least two pin segments with resilient material interposed between them. One pin segment provides substantially more than half of the rigid cross-sectional area of the pin along its axial length to reduce the possibility of shear failure. The increased rigidity of the one pin segment simplifies the pin assembly construction since only the one pin segment need be forged or molded, for example, while additional pin segments may be produced by stamping or simple forming of sheet material.

It is accordingly an object of the present invention to provide a cylindrical retaining pin assembly of improved reliability and strength where one pin segment provides substantially more than half of the rigid cross-sectional area of the pin assembly.

Other objects and advantages of the present invention are made apparent from the following description with reference to the accompanying drawings. In the drawings:

FIG. 1 is a side elevation view of a ripper tip secured upon a shank by retaining pin;

FIG. 2 is a view taken along section lines II—II of FIG. 1 to more clearly illustrate construction of the retaining pin;

FIG. 3 is a view of the assembled retaining pin taken along section lines III—III of FIG. 2;

FIG. 4 is a view similar to FIG. 3 and illustrates an alternate cross-section for the retaining pin and one of its receiving bores;

FIG. 5 is an elevation with parts in section of an alternate embodiment of the retaining pin;

FIG. 6 also illustrates an alternate embodiment of the retaining pin in a sectioned view similar to FIG. 2;

FIG. 7 is a view taken along section lines VII—VII of FIG. 6;

FIG. 8 is an elevation of a simplified version of the retaining pin assembly of FIG. 6; and FIG. 9 is an elevation of another alternate embodiment of the retaining pin assembly.

Having reference to FIGS. 1 and 2, a ripper tip 11 has a socket 12 which telescopically fits on a projecting portion 13 of a shank 14. The shank defines a central bore 16. The ripper tip defines cross-drilled end bores 17 which generally align with the central bore when the ripper tip is suitably positioned upon the shank. In this position, the central bore 16 is slightly off-set with respect to the end bores 17 so that at least a longitudinal portion of the central bore indicated at 18 is recessed with respect to the end bores. A cylindrical retaining pin assembly 19 is positioned within the three bores to secure the ripper tip upon the shank. The retaining pin assembly has a pin segment 21 which is at least partly coextensive with the two end bores 17 and forms substantially more than one half of the rigid cross-section of the retaining pin assembly along its length. The substantial pin segment 21 has a central cut-away or flattened surface 22 generally coextensive with the central bore 18 and having end surfaces 23 generally normal to the pin axis. A thin pin segment 24 is slightly shorter than the cut-away portion of the substantial pin and has generally normal end surfaces 26 to abut with the cut-away end surfaces 23. A resilient spreader 27 is interposed between the cut-away surface 23 of the substantial pin and the thin pin segment so that when the pin assembly is inserted within the bores, the thin pin segment is urged into the recess 18 formed by the central bore relative to the end bores. The end surfaces 28 of the thin pin segment are preferably beveled to facilitate removal of the pin assembly from the bores when axial force is applied to one end of the pin assembly. The end surfaces 29 of the substantial pin segment completely form the ends of the pin assembly in the end bores 17 so that, during insertion or removal of the pin assembly from the bore, axial force is applied only to the substantial pin segment. This feature together with the abutting relation of surfaces 28, 26 prevents the application of shear forces upon the resilient member. It is to be noted, particularly in FIG. 3 that the pin assembly 19 substantially fills both the central bore 16 and the end bores 17 to prevent dirt or granular material from working into the bores and interfering with normal operation or removal of the pin assembly from the bores.

It may also be noted from FIGS. 2 and 3 that if the entire pin assembly 19 is rotated within the bores, the thin pin segment would no longer be in alignment with the recess portion 18 of the central bore and it would not positively prevent axial movement of the pin assembly out of the bores.

Although such rotation would be resisted by the spreader force exerted by the resilient member 27, an alternate embodiment is illustrated in FIG. 4 to positively prevent such rotation of the pin assembly. The pin assembly 19' in FIG. 4 is similar to that in FIGS. 2 and 3 with the exception that the end bores, as at 17', are of oval configuration. At least a portion of the substantial pin segment 21' is of a similar oval configuration so that its axial end will mate with the oval end bores and prevent rotation of the pin assembly.

Another alternate pin assembly 19'', illustrated in FIG. 5, is similar to those already discussed. However, to illustrate the simplified construction possible with the present pin assembly, the pin segment 24'' is formed or stamped from sheet metal. The resilient member 27'' acts against the inside surface of the thin pin segment in the pin assembly.

FIGS. 6 and 7 illustrate another alternate embodiment where the shank portion 13' defines a cylindrical central bore 31. Cross-cut bores 32 in the ripper tip 11' have a slightly larger oval dimension and are in coaxial alignment with the central bore 31 when the ripper tip is suitably positioned on the shank. A retaining pin assembly 33 comprises a substantial pin segment 34 which provides substantially more than one half of the rigid cross-section of the pin assembly along its length. The substantial pin segment is semi-cylindrical to mate with the central bore 31 and has its end surfaces cut away or flattened at 36 to form a lug 37 at the midlength of the substantial segment. A thin pin end segment 38 is spaced apart from each cut-away surface 36 by a resilient spreader member 39. The inner ends 41 of the two thin pin segments positively abut the central lug 37 of the substantial pin segment within the pin assembly. Shoulder means 42 are defined at each end of the substantial pin segment. Shoulder means 43 are defined at the outer end of each thin pin segment. These shoulders act axially against the shank projection about its central bore and resist movement of the pin assembly out of the bores.

An alternate pin embodiment 33' in FIG. 8 represents a simplified version of the embodiments of FIGS. 6 and 7. The thin pin segments 38' are similar to the thin pin segments 38 of FIG. 6 with the exception that they do not include shoulder means for resisting axial motion of the pin assembly. Since the substantial pin segment 34 provides rigidity for the pin assembly, its shoulder means 42 provides the main resistance to axial movement of the pin assembly. Removal of the shoulder means from the thin pin segments 38' further simplifies their construction without effectively detracting from pin performance.

Still another embodiment 33'' in FIG. 9 has most of the advantages of the embodiments in FIGS. 6 and 8 but can be inserted into or removed from the bores in only one direction because its substantial pin segment 34' has completely encircling shoulder means 51 at one end. However, still further simplification of the retaining pin is made possible by this construction. The left end of the cylindrical substantial pin segment 34' is cut away or flattened at 52 to form a generally normal surface 53 which is generally midway along the length. A thin pin segment 54 is generally coextensive with the cut-away surface 52 and has an inner end 56 to positively abut the normal cut-away surface 53. The thin pin segment is urged apart from the substantial pin segment by resilient spreader member 57 which is interposed therebetween. The left end of the substantial pin segment has shoulder means 58 to resist removal of the pin from the bore except when axial force is applied to the left end of the pin assembly. Shoulder means indicated in phantom at 59 may also be formed at the left end of the thin pin segment 54 to further resist loss of the pin.

What I claim is:

1. A generally cylindrical retaining pin assembly for securing together a member having a central bore with another member positioned to have a bore at each end of the central bore, said retaining pin assembly comprising a rigid elongated pin having symmetrical end portions including cylindrical end segments for disposition within said bores of said other member and an intermediate semicylindrical segment defining a continuation of the cylindrical surfaces of said end segments and providing substantially more than half of the rigid cross-section of the pin assembly along its axial length to minimize shear failure of the pin assembly, said intermediate pin segment having at least one chordal surface between its ends which is generally parallel to the pin axis, said cylindrical end segments defining opposed surfaces normal to the pin axis at the ends of said chordal surface, at least one substantially elongated pin segment and comprising a semi-cylindrical resilient member having a chordal surface in engagement with the chordal surface of the intermediate pin segment and engaging said normal surfaces of said end segments, said resilient member projecting radially outwardly of said cylindrical end segments within the assembled pin and a rigid sheet metal member of arcuate transverse cross-sectional configuration enbracing the exterior of said outwardly projecting semi-cylindrical resilient member, said rigid sheet metal member being beveled at its opposite ends to facilitate removal of the pin assembly in either direction from the bores of the members being secured together.

2. The invention of claim 1 wherein said sheet metal member includes inturned ends defining shoulder means engageable with said normal surfaces of said end segments for resisting axial motion of the assembled retaining pin in a bore and to transmit thrust forces applied to either end segment during said removal.

3. The combination of claim 1 wherein the central bore has at least a longitudinal portion of its surface forming a recess relative to the end bores, the thin pin segment being centrally disposed in the pin assembly and urged into the central bore recess by the resilient means when the pin assembly is disposed in the bores, said substantial pin segment completely forming both ends of the pin assembly.

References Cited
UNITED STATES PATENTS

| 2,798,403 | 7/1957 | Launder | 85—8.3 |
| 2,870,667 | 1/1959 | Murtaugh | 85—8.3 |
| 2,927,387 | 3/1960 | Drover | 85—8.3 X |
| 2,949,687 | 8/1960 | Peklay et al. | 85—8.3 X |
| 2,991,569 | 7/1961 | Launder | 85—8.3 X |
| 3,382,005 | 5/1968 | Kiefer | 85—8.3 X |

RAMON S. BRITTS, Primary Examiner

U.S. Cl. X.R.

37—142